April 21, 1953     J. J. PHILLIPS ET AL     2,636,083
FLEXIBLE HOLLOW PIPE WAVE GUIDE
Filed March 4, 1950
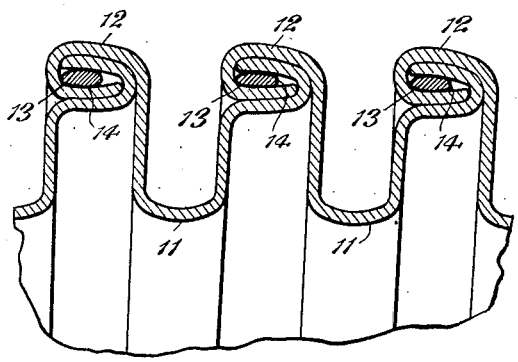
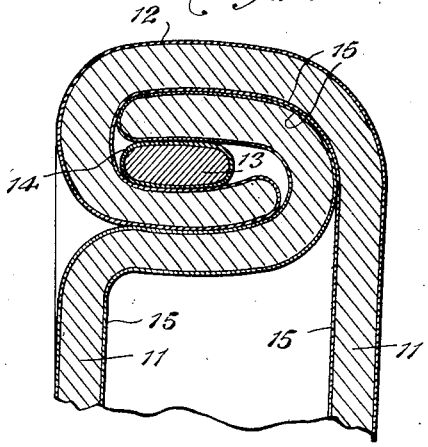
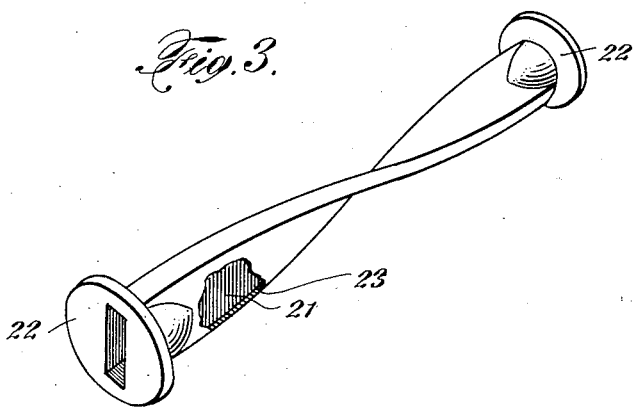
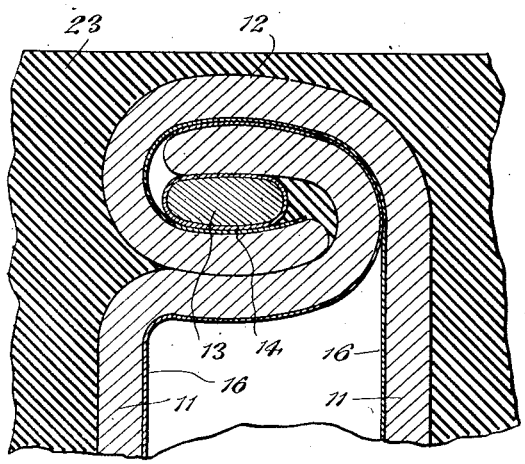
INVENTORS
JOHN J. PHILLIPS
ARNOLD F. DAREY
Emery, Varney, Whittemore & Dix
ATTORNEYS Patented Apr. 21, 1953

2,636,083

UNITED STATES PATENT OFFICE 2,636,083

FLEXIBLE HOLLOW PIPE WAVE GUIDE

John J. Phillips and Arnold F. Darey, Irvington, N. J., assignors, by mesne assignments, to Titeflex, Inc., Newark, N. J., a corporation of Massachusetts Application March 4, 1950, Serial No. 147,614

2 Claims. (Cl. 178—44)

This invention relates to flexible, twistable metal tubing and to flexible, twistable waveguides made from such tubing for transmitting electrical energy at high frequencies. More particularly, the invention relates to improvements in flexible, twistable tubing comprising a strip of metal wound in convolutions with its edges overlapping and interlocked in a helically extending seam, and to improved wave guides made from such tubing.

It is an object of the invention to provide improved flexible, twistable metallic tubing. It is a further object of the invention to provide improved flexible, twistable waveguides. It also is an object of the invention to provide convoluted metallic tubing in which a relatively soft wire located between the interlocked edges of the convolutions provides a fluid-tight metal-to-metal seal which does not seriously detract from the twistability of the tubing and which has high resistance to galvanic corrosion at the areas of contact. Another object of the invention is to provide a flexible, twistable waveguide which has high electrical conductivity between turns. Still another object of the invention is to provide a flexible, twistable waveguide having a molded covering rubber or the like in which passage of the covering material through the wall of the waveguide, between convolutions, during the molding operation is avoided. Other objects and advantages of the invention will appear hereinafter.

A preferred embodiment of the invention selected for purposes of illustration and description is shown in the accompanying drawings, wherein:

Figure 1 is a longitudinal section, upon an enlarged scale, through a tube wall showing several turns of convoluted metallic tubing made according to the present invention;

Figure 2 is a sectional view through a single seam between convolutions, upon a considerably enlarged scale as compared with Figure 1, to disclose certain features of the invention more fully;

Figure 3 is a perspective view of a flexible, twistable waveguide having end flanges and a molded rubber jacket enclosing the tube between the end flanges; and Figure 4 is a sectional view, similar to Figure 2, through a single seam of the waveguide of Figure 3, showing the maximum depth of penetration of the rubber compound into the seam.

It has been suggested heretofore in the manufacture of convoluted metal tubing to insert a packing of one kind or another in the helical seam between the adjacent convolutions. Sometimes a solder thread has been inserted in the seam during manufacture and the tube subsequently has been heated to solder the interlocked edges together. By this method it is possible to provide a fluid-tight tubing, but the soldering of the strip edges together in the seam prevents twisting the tube. In other cases a hard wire has been inserted in the seam and there has been no soldering. Such a tube may be twisted with comparative ease, but it is difficult or impossible to make a fluid-tight tube, and if the wire is made of different metal than the tubing there is danger of galvanic corrosion at the areas of contact. Various types of non-metallic packings have been proposed, but it is difficult to provide a fluid-tight joint with non-metallic packings.

In recent years convoluted metal tubings have been used as waveguides for the transmission of microwaves, i. e. electrical energy of very high frequencies. Such waveguides usually are rectangular in transverse section, the major axis of the transverse section being twice its minor axis. It is desirable that these waveguides be twistable as well as flexible, and this is not possible in a soldered seam tubing. To minimize the attenuation of the electric waves which are to be transmitted, the waveguides desirably should be made from, or coated at least interiorly with, a good conducting material. Common practice has been to plate a few ten-thousandths of an inch of silver on to copper, brass, bronze, or other material which has good mechanical strength and has as good electrical conductivity as is consistent with strength. It is desirable, from the standpoint of attenuation, that the electric resistance between convolutions also be kept very low and this makes the use of non-metallic packing materials in the seam impractical.

It is desirable in some cases to encase the waveguides with flexible coverings of rubber or similar material which are molded in place on the waveguides. Such coverings usually are applied under considerable pressure and unless there is a tight seam the compound may be forced through between the interlocked edges of the convolutions into the interior of the waveguide. The presence of such material on the interior of the waveguide is objectionable, and this material also may insulate the convolutions one from another electrically, or substantially increase the electrical resistance between convolutions.

According to the present invention a flexible, twistable convoluted tube is provided in which a composite wire is included in the seam between convolutions during the manufacture of the tube. This wire comprises a core of soft material, for example lead, which is readily deformable under the pressures employed in the seaming operation, so as to provide extended contact areas and insure a fluid-tight seal between convolutions. Where resistance to galvanic corrosion is important, this wire desirably will be coated with metal which is the same as the metal of the strip at the areas of contact therewith, thus minimizing or eliminating the possibility of galvanic corrosion at the areas of contact. If the strip is made of a single metal or alloy, the soft packing wire desirably will be coated with that metal or alloy. If a coated strip is used, then the soft packing wire should be coated with the same metal used for coating the strip. In waveguides, resistance to galvanic corrosion ordinarily is not of prime importance, but it is important to have the soft packing wire, a poor electrical conductor, coated with a metal of high electrical conductivity, such as silver, in order to insure low electrical resistance between convolutions.

Referring now to the drawings, Figures 1 and 2 are longitudinal sections through the wall of a flexible, twistable tube illustrating the present invention. This convoluted tube is made by helically winding and seaming a preformed strip of metal. As shown in Figure 1, the strip forming the tube is uncoated, whereas in Figure 2 the strip is coated or plated with a thin layer of another metal. The tube may be made, for example, by the method and means disclosed in the John S. Wyllie Patent 2,440,792, except that the solder thread included by Wyllie during the seaming operation is replaced by the composite wire herein disclosed.

Figures 1 and 2 show the contacting edges of adjacent convolutions of the metal strip 11 interfolded to form the helically extending seam 12. Extending along within the seam and included therein during the manufacture of the tube is a composite wire comprising a core 13 of relatively soft deformable material, such as lead, and a coating 14 of metal which is the same as the metal of the strip 11 at the areas of contact between the wire and strip. In Figure 1, the coating 14 is made of the same metal as the strip 11. In Figure 2, the strip 11 is coated with another metal, indicated at 15, and the wire coating 14 will be made of the same metal as the strip coating 15.

If the tube is to serve as a waveguide, the strip 11 may be made, for example, of brass and coated on the side which will form the interior of the tube with a few ten-thousandths of an inch of a good electrical conductor, for example, silver. Such a coating is indicated at 16 in Figure 4. Desirably the wire coating 14 also will be made of silver for good conductivity between convolutions.

The central portion or pore 13 of the composite wire is made of relatively soft material so that during the manufacture of the convoluted tube the wire can be deformed under the pressures employed in the seaming operation to cause the wire to fill the available space and provide relatively large continuous areas of intimate contact with both of the interlocked edges of the metal strip. This is shown, somewhat diagrammatically, in Figures 2 and 4. It will be understood that the precise location of the composite wire in the seam may vary somewhat as long as the wire is deformed during the manufacturing operation to provide the continuous areas of intimate contact which effect a seal and insure good electrical continuity between adjacent convolutions.

Desirably the outer shell or coating 14 of the composite wire will be made of the same metal as the strip 11 at the areas of contact therewith, for the reasons already set forth. This coating 14 need be only thick enough to insure that adequate continuity will survive the deforming of the wire during the seaming operation. The coating should not be made thick enough to prevent such deformation of the wire cross section during the seaming operation as is necessary to make the wire surface conform closely to the adjacent areas of the strip 11.

Figure 3 shows a flexible, twistable, rectangular waveguide comprising a convoluted tube 21 to which end flanges 22 are attached for the purpose of making connections to other lengths of waveguide or to other electronic equipment. Enclosing the convoluted tubing, and extending the full length therewith between the end flanges 22, is a protective covering 23, for example, a jacket of rubber compound molded in place on the tubing and vulcanized under pressure. Application of the jacket under pressure causes the rubber compound to enter the outer portion of the folded seam, as shown in Figure 4, and press against the composite wire, thus serving further to seat the soft wire in extended, intimate engagement with the surfaces of the interfolded edges of the metal strip. Since the composite wire in the seam in the convoluted tubing seals the seam, material of the covering 23 will not enter the interior of the tube, or materially increase the electrical resistance between adjacent convolutions. The maximum depth to which the covering material can penetrate the seam is limited by the location of the wire in the seam. This is disclosed in Figure 4.

This invention may be variously modified and embodied within the scope of the subjoined claims.

We claim:

1. In a flexible, twistable waveguide for transmitting electrical energy at high frequencies, in combination, a tube comprising a metal strip wound in convolute form with the overlapping edges interfolded in a helical seam, a plate flange secured to each end of the tube for connecting the waveguide in an electrical circuit, an easily deformable composite metal wire extending in the helical seam to improve the electrical conductivity and the mechanical seal between the interfolded edges of the metal strip, said wire comprising a core of soft metal of relatively low electrical conductivity having a continuous, thin coating of harder metal of higher electrical conductivity, the soft-cored wire having been deformed during the interfolding of the strip edges while forming the seam so as to have relatively large continuous areas of its coating metal of high electrical conductivity in intimate contact with both of the interfolded edges of the metal strip, the coating metal of the wire being the same as the metal of the strip at the area of contact therewith, and a pressure molded rubber jacket enclosing the tube between the end flanges, the rubber extending into the seam, its maximum depth of penetration into the seam being limited by its engagement against the deformed sealing wire.

2. In a flexible, twistable waveguide for transmitting electrical energy at high frequencies, in combination, a tube comprising a metal strip wound in convolute form with the overlapping edges interfolded in a helical seam, and an easily deformable metal wire extending in the helical seam to improve the electrical conductivity and the mechanical seal between the interfolded edges of the metal strip, said wire comprising a core of soft metal of relatively low electrical conductivity having a continuous thin coating of harder metal of higher electrical conductivity, the soft-cored wire having been deformed during the interfolding of the strip edges while forming the seam so as to have relatively large continuous areas of its coating metal of high electrical conductivity in intimate contact with both of the interfolded edges of the metal strip, the coating metal of the wire being the same as the metal of the strip at the area of contact therewith.

JOHN J. PHILLIPS.
ARNOLD F. DAREY.

References Cited in the file of this patent

UNITED STATES PATENTS

| Number | Name | Date |
| --- | --- | --- |
| 925,317 | Eldred | June 15, 1909 |
| 1,954,724 | Collom | Apr. 10, 1934 |
| 2,556,187 | Ingalls | June 12, 1951 |

FOREIGN PATENTS

| Number | Country | Date |
| --- | --- | --- |
| 12,482 of 1914 | Great Britain | May 20, 1914 |

OTHER REFERENCES

Winchell: "Introduction to Flexible Waveguides"; CQ Magazine, November 1946, pages 25, 26, 27, 59, 60. 178-44.1F.